(12) United States Patent
Dissing

(10) Patent No.: US 11,879,491 B2
(45) Date of Patent: Jan. 23, 2024

(54) SCREW WITH MILLING-RIBS FOR COUNTERSINKING THE SCREW AND USE OF THE SCREW

(71) Applicant: Dissing A/S, Skanderborg (DK)

(72) Inventor: Claus Hornstrup Dissing, Ry (DK)

(73) Assignee: DISSING A/S, Skanderborg (DK)

( * ) Notice: Subject to any disclaimer, the term of this patent is extended or adjusted under 35 U.S.C. 154(b) by 215 days.

(21) Appl. No.: 17/415,869

(22) PCT Filed: Dec. 16, 2019

(86) PCT No.: PCT/DK2019/050393
§ 371 (c)(1),
(2) Date: Jun. 18, 2021

(87) PCT Pub. No.: WO2020/125890
PCT Pub. Date: Jun. 25, 2020

(65) Prior Publication Data
US 2022/0056942 A1 Feb. 24, 2022

Related U.S. Application Data

(60) Provisional application No. 62/781,722, filed on Dec. 19, 2018.

(30) Foreign Application Priority Data

Dec. 19, 2018 (DK) .............. PA 2018 70827

(51) Int. Cl.
*F16B 35/06* (2006.01)
*F16B 25/00* (2006.01)
*F16B 25/10* (2006.01)

(52) U.S. Cl.
CPC ........ *F16B 35/065* (2013.01); *F16B 25/0015* (2013.01); *F16B 25/106* (2013.01)

(58) Field of Classification Search
CPC ... F16B 25/0015; F16B 25/106; F16B 35/065
USPC ................................................. 411/399
See application file for complete search history.

(56) References Cited

U.S. PATENT DOCUMENTS

| | | | |
|---|---|---|---|
| 586,232 A | 7/1897 | English | |
| 1,151,861 A | 8/1915 | Brumback | |
| 2,982,166 A * | 5/1961 | Hobbs | F16B 25/0015 411/959 |
| 5,199,839 A | 4/1993 | DeHaitre | |

(Continued)

FOREIGN PATENT DOCUMENTS

| | | |
|---|---|---|
| CN | 1981137 A | 6/2007 |
| CN | 101498334 A | 8/2009 |

(Continued)

OTHER PUBLICATIONS

Search Report from Chinese Patent App. No. 2019800842439 (dated Jul. 12, 2022).

*Primary Examiner* — Gary W Estremsky
(74) *Attorney, Agent, or Firm* — Cermak Nakajima & McGowan LLP; James Creighton Wray

(57) ABSTRACT

In order to prevent wood fringes at the edge of a hole from a countersunk screw (1), the screw-head (2) is provided with a tapering underside and inclined milling-ribs with cavities between the milling-ribs on the tapering underside.

8 Claims, 3 Drawing Sheets

(56) References Cited

U.S. PATENT DOCUMENTS

| | | | |
|---|---|---|---|
| 5,203,657 A * | 4/1993 | Nagoshi | F16B 35/065 411/404 |
| 5,205,694 A * | 4/1993 | Nagoshi | F16B 23/0023 411/404 |
| 5,249,882 A * | 10/1993 | Nagoshi | F16B 35/065 411/959 |
| 7,293,947 B2 | 11/2007 | Craven | |
| 7,604,445 B1 * | 10/2009 | Dicke | F16B 35/065 411/188 |
| D708,509 S | 7/2014 | Lin | |
| D853,830 S * | 7/2019 | Wang | F16B 35/065 D8/387 |
| 2007/0224020 A1 * | 9/2007 | Hsieh | F16B 35/06 411/399 |
| 2007/0237606 A1 | 10/2007 | Takasaki | |
| 2009/0123253 A1 * | 5/2009 | Hettich | F16B 35/065 411/399 |
| 2015/0063947 A1 * | 3/2015 | Huang | F16B 35/065 411/393 |
| 2015/0223407 A1 * | 8/2015 | Carroll | A01G 9/243 47/17 |

FOREIGN PATENT DOCUMENTS

| | | |
|---|---|---|
| CN | 103047245 A | 4/2013 |
| DE | 3344048 A1 | 6/1984 |
| DE | 9106746 U1 | 7/1991 |
| EP | 0705987 A1 | 4/1996 |
| EP | 1182367 A2 | 2/2002 |
| EP | 2522865 A1 | 11/2012 |
| EP | 2846053 A1 | 3/2015 |
| EP | 3002468 A1 | 4/2016 |
| EP | 3067575 A1 | 9/2016 |
| FR | 2784722 A1 | 4/2000 |
| GB | 972653 A | 10/1964 |
| GB | 1313050 A | 4/1973 |
| GB | 2227540 A | 8/1990 |
| GB | 2336415 A | 10/1999 |
| JP | 2010-116949 A | 5/2010 |
| RU | 2006104560 A | 6/2006 |
| TW | 201422932 A | 6/2014 |
| TW | 201437498 A | 10/2014 |
| TW | M530357 U | 10/2016 |

* cited by examiner

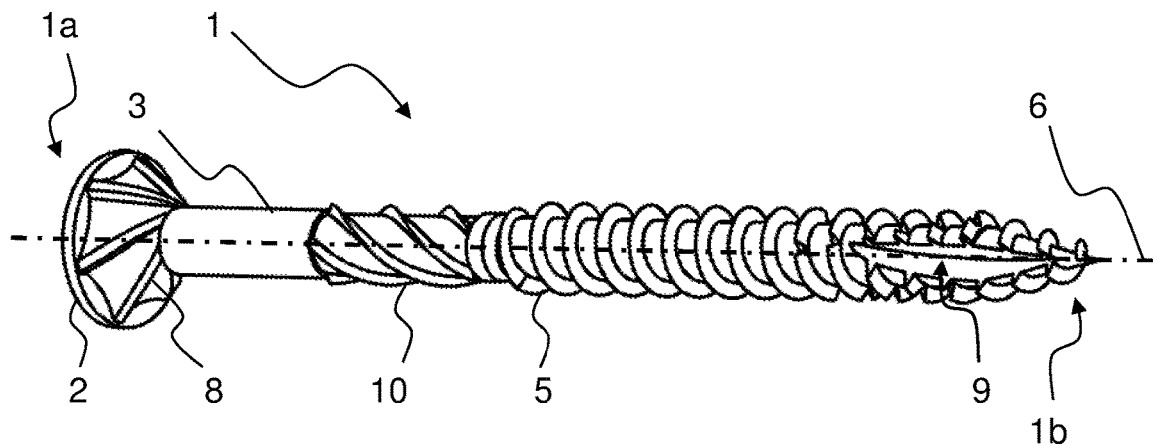
FIG. 1
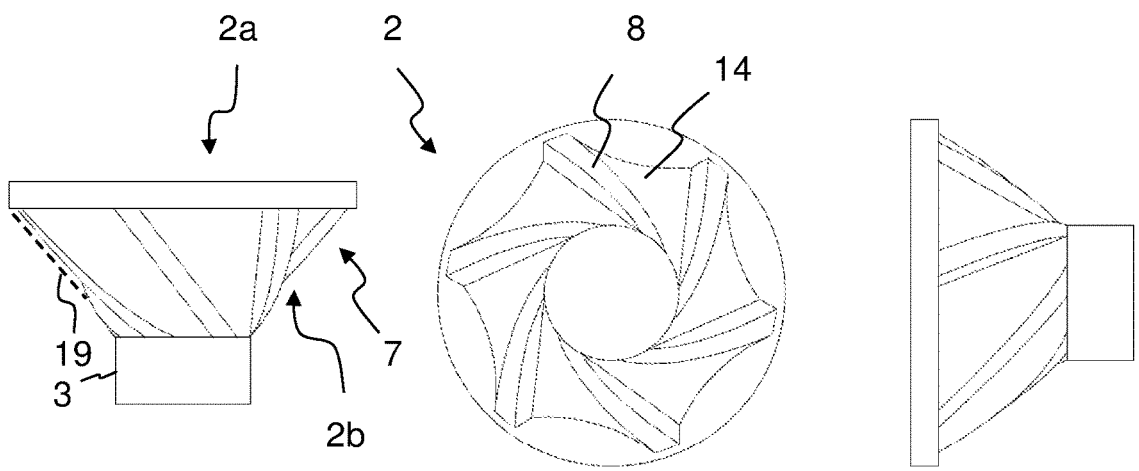
FIG. 2a
FIG. 2b
FIG. 2c
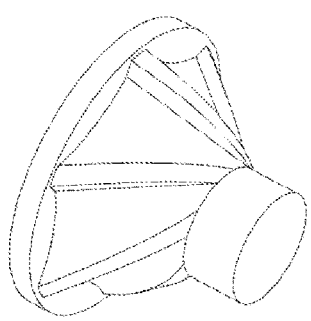
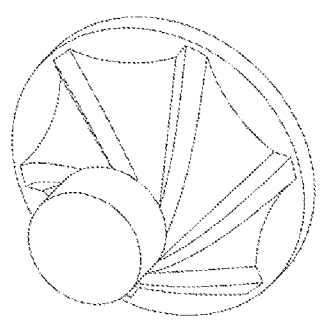
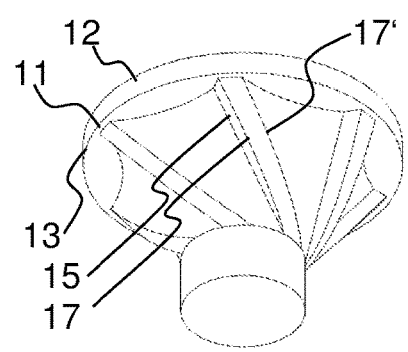
FIG. 2d
FIG. 2e
FIG. 2f

SCREW WITH MILLING-RIBS FOR COUNTERSINKING THE SCREW AND USE OF THE SCREW

This application claims the benefit of Danish Application No. PA 2018 70827 filed Dec. 19, 2018, U.S. Provisional Application No. 62/781,722 filed Dec. 19, 2018 and PCT/DK2019/050393 filed Dec. 16, 2019, International Publication No. WO 2020/125890 A1, which are hereby incorporated by reference in their entirety as if fully set forth herein.

The present invention relates to a screw, especially a wood-screw, according to the introductory part of the claims, wherein the underside of the screw-head comprises a tapered surface with a plurality of milling-ribs that are inclined for pressing milled material inwards towards the shank during countersinking of the screw.

BACKGROUND OF THE INVENTION

For a proper and smooth countersinking of a screw-head into a material, it is common practice to provide the underside of the screw-head with serrations, for example milling-ribs. The milling-ribs are often oriented such that they are lying in a plane that also contains the central axis of the screw. In other cases, they are inclined to such plane. In even further cases, serrations are curved, for example along a spiral path or S-curved. Examples of these various shapes are disclosed in German publication DE3344048A1, German utility model DE9106746U1, European patent applications EP0705987, EP1182367, EP2522865, French patent application FR2784722, British patent applications GB2227540, GB972653, GB2336415, U.S. Pat. Nos. 586,232, 1,151,861, 5,199,839, 7,293,947, USD708509, and Chinese patent application CN101498334A.

In all of the above prior art, the inclined milling-ribs are outwards-pressing in the sense that the material that is milled by the milling-ribs is pressed in an outwards direction as seen from the screw shank.

For better understanding, the term "outwards-pressing milling-ribs" is used herein for skew milling-ribs by which material is pressed outwards during countersinking of the screw into the material. Similarly, the term "inwards-pressing milling-ribs" is used for skew milling-ribs by which material is pressed inwards towards the shank during countersinking of the screw into the material. Inward-pressing milling-ribs have a front-side that is inclined by an angle relatively to the screwing-in direction such that the part of the milling rib near the rim of the screw-head is leading during screwing-in of the screw. Outward-pressing milling-ribs have a front-side that is inclined relatively to the screwing-in direction such that the part of the milling rib near the shank is leading during screwing-in of the screw.

The term "front-side" of the milling-rib is used herein for the side of the milling-rib that is pushed against the material when the screw during rotation is countersunk into the material. The term "back side" is the opposite side of the milling-rib relatively to the front-side.

European patent application EP3067575A1 discloses inwards-pressing milling-ribs that protrude from the conical surface and which are arranged in an incline orientation that causes the wood to be forced towards the shank during countersinking.

European patent application EP3002468A1 discloses ribs that protrude from the inclined surface on the underside of the head. The ribs are curved helically and offset and also pressing the wood inwards towards the stem during countersinking. The curving of the ribs is such that the edges near the shank are parallel to the rotational direction when the ribs start engaging with the wood surface during countersinking, so that the initial action is rather cutting than milling during the first phase of the countersinking. Only during further countersinking, when other parts of the ribs engage with the wood, the angle gradually deviates from a tangential direction and the initial cutting of the wood surface is followed by a milling action. During continued countersinking, deeper layers of the wood are first cut and then milled by the curve ribs.

British Patent document GB15102 discloses a screw with straight inward-pressing milling edges integrated in the underside of the head. The milling edges are partially formed by cavities inside the surface of the conical underside and are angled such that the milled wood is pressed inwards towards the stem. The countersunk hole formed by this screw is conical. It is emphasized in this disclosure for the milling edges that "in no case do they come out at the face of the head". This integration in the head as cavities is done in order to retain strength and have the appearance as an ordinary screw. Curved milling-ribs are disclosed in Patent application TW201422932A and CN103047245A from Taiwan and China, respectively. The milling-ribs are provided within a conical underside of the head to form a conical countersunk hole.

For a proper countersinking, even small variations in the shape of the screw-head and the milling-ribs can have substantial effect. For example, the effect of the screw-head shape and the shape of the milling-ribs may result in the countersunk hole to appear clean or may result in broken wood fibers as fringes around the hole, which is not desired.

DESCRIPTION OF THE INVENTION

It is the objective of the invention to provide an improvement in the art. In particular, it is an objective to provide a screw with improved capabilities for countersinking in a material, for example in wood. This is achieved with a screw as described in more detail in the following.

As an alternative to wood, the screw is also useful for countersinking other materials, including certain composite materials, for example composites based on wood fibers, and polymers, for example fiber reinforced polymers.

The screw comprises a screw-head at a first end of the screw and a shank extending from the screw-head towards an opposite, second end of the screw. A thread is provided on the shank for screwing the screw into a material by a fastening-tool. The screw has a longitudinal central axis extending between the first end and the second end. The screw-head has an upper side and an underside, wherein the upper side comprises a tool-receiver for engagement with the fastening-tool.

The underside of the screw-head has a tapered surface with a taper-direction towards the shank. The taper-direction is defined in a plane that contains the central axis, and, thus, is parallel with the central axis and extends through the center of the screw. The tapered surface is provided with a plurality of milling-ribs. Each of the milling-ribs comprises a front-side that is oriented towards a milling direction and delimited by a milling-edge for milling material during countersinking of the screw-head.

The front-side is inclined relatively to the taper-direction. The inclination of the front-side and the milling-edge is oriented such that the milling-rib is inward-pressing milled material towards the shank during countersinking of the screw-head in the material. The term inward-pressing was explained in more detail in the introduction above.

In some embodiments, the milling-ribs have a planar front-side and the milling-edge, accordingly, is in a plane of the planar front-side of the milling rib. Both aspects have turned out in practice to result in an improved efficient and aggressive cutting of the wood fibers during countersinking. The planar front-side has turned out to be by far more efficient than rounded ones, for example as the scallop-formed serrations disclosed in U.S. Pat. No. 5,199,839 or the spiralling edges in EP3067575A1 by Kwantex.

Between the milling-ribs, cavities are provided. These cavities extend from a first position near the shank towards at second position near the rim of the head. The cavities are concave and smoothly concavely curving from one milling edge to the neighboring milling edge. This smoothly curving concave cavity starts at the second position at or near the rim of the screw-head and continues to the first position at or near the shank. For example, the concavity extends to the stem, where it follows a section of the stem. The concave smoothly curving is measured relatively to a frusto-conical surface under the head of the screw such that the concave cavity smoothly curves into the underside of the head.

This is in contrast to the aforementioned CN103047245A, where the bottom of the cavities are shaped smoothly convex, namely by folling the surface of a conus.

The combination of the inclined inward-pressing orientation and the concave cavities has revealed surprising results when used in practice as explained in more detail in the following. The front-side with the cutting-edge, especially if the front-side is planar, is aggressively efficient when countersinking the screw-head into a material, for example wood. Due to the planar front-side being oriented such that the milled material is pressed inwards towards the shank, an efficient stopping of the screw in the countersunk hole is achieved despite the aggressive milling. The milled material is accumulated in the countersunk hole and compressed therein due to the inwards pressing of the material. During this compression, a layer of the compact material is gradually formed on the tapering underside of the screw-head and accumulated in the concave cavities between the milling-ribs during countersinking until the volume between the milling-ribs is so filled with compacted material that the milling-ribs are prevented from further milling. As compared to the convex cavities of the prior art, more material is compressed in the concave cavities, which leads to a more compact and solid connection between the screw-head and the material without causing the material, especially wood, to break. Thus, the additional material taken up in the concave cavities act as a damper during stopping of the screw and as a binder between the screw head and the material into which the screw-head has been countersunk.

Especially for wood, the result during countersinking is proper stopping of the screw as soon as the screw-head is countersunk into the material without causing breakage of the wood.

In addition, due to the compacted material in the concave cavities, the screw has a high tightening force against an underlying sub-structure when a piece of material, for example a wood element, such as timber, is screwed against such sub-structure, for example a second wood element, such as a beam. For this reason, the planar front-side and the inclined orientation thereof that is inward-milling has a surprising positive synergistic effect.

In some embodiments, the milling ribs have a constant width. For example, the planar front-side and the back side of the milling-ribs are parallel.

The cavities need not extends all the way to the rim of the head. Optionally, a flat, narrow edge-region on the underside of the head at the rim is provided to cut the wood fringes. For example, the flat edge-region is connecting the rim with the tapered surface. At the rim of the flat edge-region, a cutting edge is provided to assists in cutting wood fibers at the edge of the countersunk hole.

In some embodiment, the flat edge-region has a surface in a plane perpendicular to the central axis. In some cases, the width of the flat edge-region, as measured radially from the rim of the screw-head to the start of the ribs near the rim of the screw-head, is in the range of 1-25% of the diameter of the screw-head, for example 1-5% of the diameter.

Optionally, along the rim of the screw-head, alternatively or in addition to the flat edge-region, there is provided a collar extending a distance towards the second end, the distance typically being in the range of 0.1-5 mm, depending on the size of the screw. Such collar makes the cutting of wood fibers at the edge of the countersunk hole more efficient. As a further alternative, a sharp cutting-edge is provided at the rim, which cutting-edge is directed towards the second end.

When countersinking the screw, it has been experienced that wooden fringes around the countersunk screw are minimized and much less than when using similar prior art screws.

Optionally, the screw comprises a cutting-notch in a longitudinal direction of the screw along the front part of the thread in order to cut or mill its way into the material. The front part is at the second end of the screw.

Optionally, In order to reduce drag on the screw, the screw comprises a knurled shoulder between the thread and the head. Typically, the knurls are provided in direct extension of the thread. For example, the knurled shoulder is provided at a distance to the head, optionally at a distance corresponding to between 1 and 40% of the total length of the screw.

Although, such screw can be used for various materials, the screw is especially useful for screwing into wood.

A typical overall length L of the screw is in the range 10-1000 mm, although, it can also be longer.

The thread corresponds typically to a length of at least 10% of L.

If knurls are provided, these are typically over a range of 1-40% of L.

Typical angular values for the tapering underside of the head are within angles in the range of 20°-60° with the longitudinal axis. Thus, the countersunk frusto-conical hole spans 40°-120° in total.

Typically, the milling edges are shaped such that the final countersunk hole is conical. However, milling edges shaped to form a more rounded countersunk hole are also possible, for example convex countersunk surfaces, including an ellipsoidal or semispherical surface or even concavely surfaces of the countersunk hole.

BRIEF DESCRIPTION OF THE DRAWINGS

The invention will be described in more detail with reference to the drawings, in which:

FIG. 1 is an overview image of the screw;

FIG. 2a is a side view of the screw head,

FIG. 2b a view onto the underside of the screw head in a direction parallel with the screw axis, FIG. 2c is a different side view, FIG. 2d-2f are different perspective views of the underside of the screw head;

DETAILED DESCRIPTION OF THE INVENTION

Figure 3A:
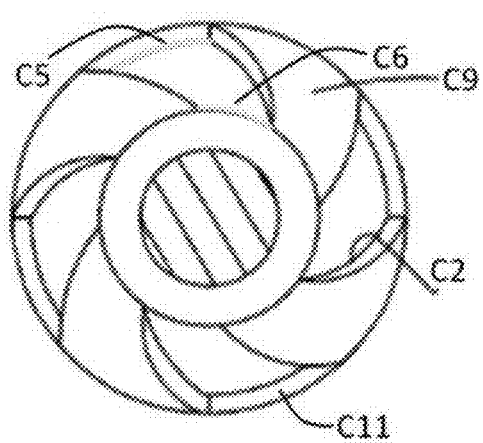
FIGS. 3a and 3b are two perspective views of comparative screw according to prior art CN103047345A.

FIG. 1 illustrates a screw that is explained in more detail in the following. The screw 1 comprises a screw-head 2 at a first end 1a of the screw 1 and a shank 3 extending from the screw-head 2 towards an opposite, second end 1b of the screw 1. A thread 5 is provided on the shank 3 for screwing the screw 1 into a material by a fastening-tool.

Figure 4:
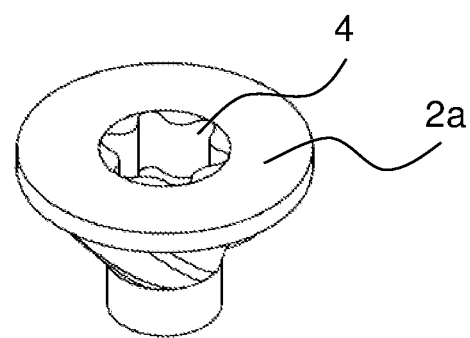
FIG. 4 illustrates an example of a tool receive in the screw head.

For the fastening tool, the screw-head 2 comprises a tool-receiver 4, for example a Hexalobular (Torx®) socket as illustrated in FIG. 4, for engagement with a corresponding fastening-tool for screwing of the screw 1.

Optionally, the screw 1 comprises a cutting-notch 9 in the thread 5 in order for the screw 1 to cut its way easier into the material. The cutting-notch 9 extends along the shaft 3 and is exemplified as extending over seven windings of the thread and with sharp edges. The cutting-notch 9 could extend over fewer or more windings.

Optionally, the screw 1 comprises a knurled shoulder 10 to reduce drag when the screw 1 is driven into the material, for example wood. The knurled shoulder 10 has an outer diameter larger than the diameter of the shank 3 near the screw-head 2 in order to create a hole wider than the shank 3. Typically, the knurled shoulder 10 is provided in immediate extension of the thread 5.

FIG. 2 illustrates the screw head 2 in various perspectives. FIG. 2a is a side view of the screw head 2, FIG. 2b a view onto the underside 2b of the screw head 2 in a direction parallel with the screw axis 6, FIG. 2c is a different side view, FIG. 2d-2f are different perspective views of the underside of the screw head.

A plurality of milling-ribs 8 are provided on the tapered surface 7 on the underside 2b of the screw head 2. The milling-ribs 8 are inclined relatively to a plane parallel with the screw axis 6 for inward-pressing of the material towards the shank 3 during countersinking of the screw-head 2.

A typical number of milling-ribs are 3-8, for example the exemplified 6 milling-ribs 8. For example, the milling-ribs 8 are arranged with identical mutual angular distance. In the present case with 6 milling-ribs, the angular distance is 60°.

The underside 2b of the screw-head 2 is provided with a tapered surface 7 that is tapering inwards towards the shank 3, wherein the taper-direction 19 is within a plane that contains the central axis 6. Typically, the full angle spanned by the tapered surface is in the range of 40°-120°, for example 60° when projected onto the plane of the drawing, when the plane also contains the central axis 6.

Figure 3B:
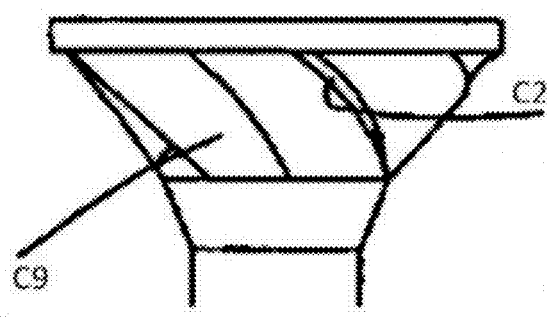
Figure 3C:
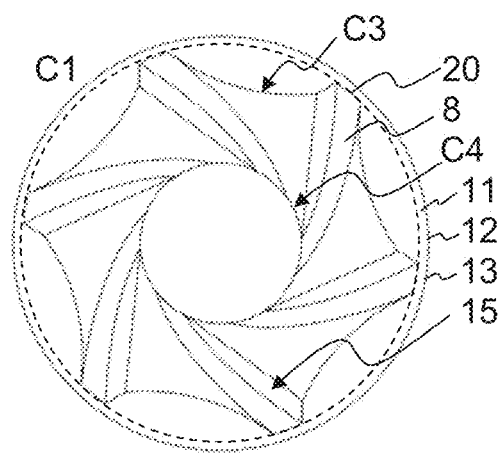
FIGS. 3c and 3d are illustrating inventive features in comparison.
Figure 3D:
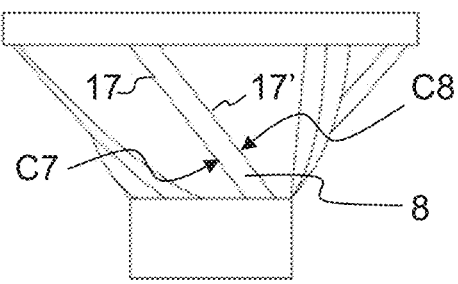

FIG. 3c and FIG. 3d illustrate some features of the screw head 2 and the milling-ribs 8 in comparison with a comparative screw head 2', which is from the prior art document CN103047245A and which is shown in FIG. 3a and FIG. 3b.

In comparison, the following observations are made when comparing the prior art drawings FIGS. 3a and 3b with the drawings in relation to the invention in FIGS. 3c and 3d and FIG. 2, especially FIG. 2f.

Whereas the milling-ribs C9 of the comparative screw extend to the rim of the screw head, the milling-ribs 8 in FIG. 3c do not. As also seen in detail in FIG. 3c, the milling ribs 8 end within a circle 20 that has a smaller diameter than the screw head 2 at its rim 12. This leaves a flat edge-region 11 between the rim 12 on the underside of the screw-head 2 and the circle 20, which is the side opposite the upper side with the tool-receiver 4. The flat edge-region 11 at the rim 12 comprises a cutting-edge 13 that cuts-off the wood fibers when the screw-head 2 is countersunk, for the example into wood.

The cutting-edge 13 creates a neatly cut edge of the countersunk hole for the screw-head 2. The flat edge region 11 extends as a circle all around the milling ribs 8 along the rim 12 of the screw head 2. In comparison, the comparative screw does not have a flat edge region that extends around as a circle, only sections C11 are provided which are located between the milling ribs C9. These sections do not have the same effect as the circular flat edge region with the circular cutting edge 13.

Whereas the milling edges C2 of the milling-ribs C9 of the comparative screw of FIGS. 3a and 3b are bending along a concave curve, the front-side 15 of the milling-rib 8 is straight planar so that the milling-edges 17 in FIGS. 3c and 3d are following a curve in a straight plane. The back-edge 17' of the milling-rib 8 is within a plane parallel with the plane of the planar front-side 15, as illustrated by the two parallel lines C7 and C8 in FIG. 3. Accordingly, the milling edges (8) have constant width.

Whereas the cavities between the milling-ribs in the comparative screw of FIGS. 3a and 3b are following a conical surface and therefore are convex, see also indicated lines C5 and C6, the cavities 14 in FIGS. 3c and 3d are concave. They are smoothly curving inwards from one milling edge to the neighboring milling edge. Furthermore, at the rim of the screw head in a plane perpendicular to the axis 6, the cavities are following a concave curve, illustrated by the curve C3 in FIG. 3c. Due to the concave cavities 14 on the underside of the head 2 as illustrated in FIG. 2f and FIG. 3c, the area under the head 1 is larger than in the comparative screw, which increases the grip in the material, for example wooden material, composite, or polymer, when countersunk.

In a plane perpendicular to the central axis 6, the cavities 14 follow a concave curve C3 near to the rim 12 and a convex curve C4 at the shank 3, as illustrated in FIG. 3c. However, the cavities 14 themselves are concave between the curves C3 and C4, thus bending inwards into the screw-head 2.

REFERENCE NUMBERS 1 screw
1a first end of the screw
1b second end of the screw 1
2 screw head
2a upper side of screw head 2
2b underside of screw head 2
3 shank
4 tool receiver in screw head
5 thread on the shank 3
6 central axis
7 tapered surface
8 milling-ribs
9 cutting-notch (optional)
10 knurled shoulder (optional)
11 flat edge-region along the rim 12
12 rim of the screw head
13 cutting-edge at rim 12
14 cavity between milling-ribs 8
15 front-side of milling-rib
17 milling edge
19 taper direction towards shank 3
20 circle within which milling ribs 8 are provided

The invention claimed is:

1. A screw (1) comprising a screw-head (2) at a first end (1a) of the screw (1) and a shank (3) extending from the screw-head (2) towards an opposite, second end (1b) of the screw (1) where a thread (5) is provided on the shank (3) for screwing the screw (1) into a material by a fastening-tool; wherein the screw (1) has a longitudinal central axis (6) extending between the first end (1a) and the second end (1b); wherein the screw-head (2) has an upper side (2a) and an underside (2b), wherein the upper side (2a) comprises a tool-receiver (4) for engagement with the fastening-tool; wherein the underside (2b) of the screw-head (2) comprises a tapered surface (7) with a taper-direction (19) towards the shank (3), the taper-direction (19) being in a plane that contains the central axis (6); the tapered surface (7) being provided with a plurality of milling-ribs (8), each milling-rib (8) comprising a front-side (15) that is oriented towards a milling direction and delimited by a milling-edge (17) for milling material during countersinking of the screw-head (2), and each milling-rib (8) comprising a back-side opposite to the front-side; wherein the front-side (15) is inclined relatively to the taper-direction (19), wherein the inclination of the front-side (15) and the milling-edge (17) are oriented for inward-pressing of milled material towards the shank (3) during countersinking of the screw-head (2) in the material; wherein smoothly bending cavities (14) are provided between the milling-ribs (8), the cavities (14) extending into the underside (2b) of the screw-head (2), wherein each of the cavities (14) is smoothly concavely curved from one milling-rib (8) to a neighboring milling-rib (8);
wherein the front-side (15) of the milling rib (8) is straight planar.

2. A screw according to claim 1, wherein each of the cavities (14) is smoothly concavely curved from the front-side (15) of one milling-rib (8) to a neighboring milling-rib (8).

3. A screw according to claim 1, wherein the milling-edges (17) are following a frusto-conical surface for milling a frusto-conical hole in the material when countersinking the screw (1).

4. Use of a screw according to claim 1 for screwing into wood or fibrous composite material or into polymer.

5. A screw (1) comprising a screw-head (2) at a first end (1a) of the screw (1) and a shank (3) extending from the screw-head (2) towards an opposite, second end (1b) of the screw (1) where a thread (5) is provided on the shank (3) for screwing the screw (1) into a material by a fastening-tool; wherein the screw (1) has a longitudinal central axis (6) extending between the first end (1a) and the second end (1b); wherein the screw-head (2) has an upper side (2a) and an underside (2b), wherein the upper side (2a) comprises a tool-receiver (4) for engagement with the fastening-tool; wherein the underside (2b) of the screw-head (2) comprises a tapered surface (7) with a taper-direction (19) towards the shank (3), the taper-direction (19) being in a plane that contains the central axis (6); the tapered surface (7) being provided with a plurality of milling-ribs (8), each milling-rib (8) comprising a front-side (15) that is oriented towards a milling direction and delimited by a milling-edge (17) for milling material during countersinking of the screw-head (2), and each milling-rib (8) comprising a back-side opposite to the front-side; wherein the front-side (15) is inclined relatively to the taper-direction (19), wherein the inclination of the front-side (15) and the milling-edge (17) are oriented for inward-pressing of milled material towards the shank (3) during countersinking of the screw-head (2) in the material; wherein smoothly bending cavities (14) are provided between the milling-ribs (8), the cavities (14) extending into the underside (2b) of the screw-head (2), wherein each of the cavities (14) is smoothly concavely curved from one milling-rib (8) to a neighboring milling-rib (8);
wherein the underside (2b) of the screw-head comprises a flat edge-region (11) along a rim (12) of the screw-head (2) and is delimited by a cutting edge (13) at the rim (12) for cutting in material during countersinking of the screw-head (2) into the material; the flat edge-region (11) extending from the cutting edge (13) to the cavities (14) and the milling-ribs (8); and
wherein the width of the flat edge-region when measured from the rim of the head to the end of the ribs near the rim is between 1% and 25% of the diameter of the screw-head (2).

6. A screw according to claim 5, wherein the flat edge-region (11) has a surface parallel to a plane perpendicular to the central axis (6).

7. A screw according to claim 5, wherein the cavity (14) at its connection to the flat edge-region (11) forms a smooth concavely curving connection line (C3) with the flat edge-region (11).

8. A screw (1) comprising a screw-head (2) at a first end (1a) of the screw (1) and a shank (3) extending from the screw-head (2) towards an opposite, second end (1b) of the screw (1) where a thread (5) is provided on the shank (3) for screwing the screw (1) into a material by a fastening-tool; wherein the screw (1) has a longitudinal central axis (6) extending between the first end (1a) and the second end (1b);
wherein the screw-head (2) has an upper side (2a) and an underside (2b), wherein the upper side (2a) comprises a tool-receiver (4) for engagement with the fastening-tool; wherein the underside (2b) of the screw-head (2) comprises a tapered surface (7) with a taper-direction (19) towards the shank (3), the taper-direction (19) being in a plane that contains the central axis (6); the tapered surface (7) being provided with a plurality of milling-ribs (8), each milling-rib (8) comprising a front-side (15) that is oriented towards a milling direction and delimited by a milling-edge (17) for milling material during countersinking of the screw-head (2), and each milling-rib (8) comprising a back-side opposite to the front-side; wherein the front-side (15) is inclined relatively to the taper-direction (19), wherein the inclination of the front-side (15) and the milling-edge (17) are oriented for inward-pressing of milled material towards the shank (3) during countersinking of the screw-head (2) in the material; wherein smoothly bending cavities (14) are provided between the milling-ribs (8), the cavities (14) extending into the underside (2b) of the screw-head (2), wherein each of the cavities (14) is smoothly concavely curved from one milling-rib (8) to a neighboring milling-rib (8);
wherein the milling-rib (8) has a constant width from the shank (3) towards a rim (12) of the screw-head (2).

* * * * *